United States Patent
Yu et al.

(10) Patent No.: US 9,823,336 B2
(45) Date of Patent: Nov. 21, 2017

(54) VERTICAL ALIGNMENT DEVICE AND METHOD FOR VEHICLE RADAR

(71) Applicant: MANDO CORPORATION, Pyeongtaek-si, Gyeonggi-do (KR)

(72) Inventors: Hanyeol Yu, Suwon-si (KR); Seok Jo Lee, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 329 days.

(21) Appl. No.: 14/631,555

(22) Filed: Feb. 25, 2015

(65) Prior Publication Data
US 2015/0241554 A1 Aug. 27, 2015

(30) Foreign Application Priority Data
Feb. 27, 2014 (KR) .................. 10-2014-0023029

(51) Int. Cl.
 *G01S 7/40* (2006.01)
 *G01S 13/93* (2006.01)
(52) U.S. Cl.
 CPC .......... *G01S 7/4026* (2013.01); *G01S 13/931* (2013.01); *G01S 2007/4034* (2013.01); *G01S 2013/9371* (2013.01)
(58) Field of Classification Search
 CPC .......... G01S 13/931; G01S 2007/4034; G01S 2013/9371; G01S 7/4026
 USPC ........................................................... 342/75
 See application file for complete search history.

(56) References Cited

U.S. PATENT DOCUMENTS

| 2001/0000130 A1* | 4/2001 | Aoki | G02B 26/101 |
| | | | 359/198.1 |
| 2003/0117902 A1* | 6/2003 | Suzuki | G04R 20/08 |
| | | | 368/47 |
| 2004/0155796 A1* | 8/2004 | Fukasawa | G06K 7/10336 |
| | | | 340/928 |

FOREIGN PATENT DOCUMENTS

| JP | 3038707 B1 | 5/2000 |
| JP | 2008-116288 A | 5/2008 |
| KR | 1020120025896 A1 | 3/2012 |

OTHER PUBLICATIONS

Chinese Office Action dated Mar. 8, 2017, for Chinese Patent Application No. 201510089229.1.

* cited by examiner

*Primary Examiner* — Timothy A Brainard
(74) *Attorney, Agent, or Firm* — Hauptman Ham, LLP

(57) ABSTRACT

Provided are a vertical alignment apparatus and method for a vehicle radar. The vertical alignment apparatus includes a case at which a shaft is formed, an antenna that is coupled with the shaft and is disposed to be rotatable about the shaft in a vertical direction, an antenna rotary member that rotates the antenna, and a stopper that limits an angle of rotation of the antenna.

10 Claims, 3 Drawing Sheets

VERTICAL ALIGNMENT DEVICE AND METHOD FOR VEHICLE RADAR

CROSS-REFERENCE TO RELATED APPLICATION

This application claims the benefit of Korean Patent Application No. 10-2014-0023029, filed on Feb. 27, 2014, the disclosure of which is hereby incorporated herein by reference in its entirety.

BACKGROUND OF THE INVENTION

1. Field of the Invention

The present invention relates to a vertical alignment device and method for a radar mounted on a vehicle and, more particularly, to a vertical alignment device and method for a vehicle radar, through which vertical alignment can be performed without a separate horizontal sensor.

2. Description of the Related Art

In general, vehicle safety systems can be classified into anti-collision systems and accident prevention systems. Anti-collision systems can minimize influences of an accident, whereas accident prevention systems enable drivers to prevent potential accidents in advance. For this reason, accident prevention systems can be regarded as more effective vehicle safety systems than anti-collision systems.

An example of such an accident prevention system is a vehicle radar. A vehicle radar detects a distance from a preceding vehicle in front of a traveling vehicle and sends a signal to a driver when the traveling vehicle approaches the preceding vehicle within a predetermined distance, or detects a distance from an object in front of a bumper of a parking vehicle and sends a signal to a driver when the bumper approaches the object within a predetermined distance. Thereby, the vehicle radar enables the driver to pay attention so as to prevent a collision accident.

Meanwhile, in such a vehicle radar, it is essential to align a vertical angle to face an accurate forward direction. The alignment of the vertical angle is a process of changing an angle of an antenna surface of the vehicle radar in order to correctly adjust a misaligned direction of the vehicle radar which is caused by an error made in a manufacturing process and a vehicle mounting process.

Up to now, vertical angle alignment has been performed manually or automatically. However, manual vertical angle alignment is troublesome, and in automatic vertical angle alignment, a separate horizontal sensor is required to check whether the alignment is accurate.

An apparatus for installation and angle adjustment of a vehicle radar is disclosed in Korean Unexamined Patent Application Publication No. 2012-0025896, which has the same function with a reduced number of components, and thus simplifies a process using a structure that enables assembly, locking, angle adjustment with respect to a bracket and a single fitting without using a separate fitting for vertical angle alignment of the vehicle radar. The prior art document does not include the technical gist of the present invention.

SUMMARY OF THE INVENTION

A vertical alignment apparatus for a vehicle radar according to an embodiment of the present invention and a vertical alignment method for a vehicle radar according to another embodiment of the present invention provide the following solution in order to address the aforementioned problems.

The present invention is directed to providing a vertical alignment apparatus and method that enable easy vertical alignment of a vehicle radar without a separate horizontal sensor.

However, the problem to be solved by the present invention is not limited to the aforementioned problem, and other unmentioned problems can be clearly understood by those skilled in the art from the following description.

A vertical alignment apparatus for a vehicle radar according to an embodiment of the present invention includes a case at which a shaft is formed, an antenna that is coupled with the shaft and is disposed to be rotatable about the shaft in a vertical direction, an antenna rotary member that rotates the antenna, and a stopper that limits an angle of rotation of the antenna.

The antenna rotary member may displace one side of the antenna upward or downward so as to rotate the antenna, and the stopper may be disposed away from a lower portion of the other side of the antenna and limit the rotation of the antenna.

The antenna rotary member may include: a vertical motion part that is in contact with a lower portion of the one side of the antenna and is movable in a vertical direction; and a motor that drives the vertical motion part.

The vertical alignment apparatus may further include an elastic member supporting the antenna at the other side of the antenna.

The one side of the elastic member may be coupled with the antenna in the vicinity of the shaft.

A point at which the other side of the antenna comes into contact with the stopper when the antenna rotary member displaces the one side of the antenna upward may be set as a zero point for vertical alignment of the antenna.

After the zero point for the vertical alignment of the antenna is set, the antenna rotary member may perform the vertical alignment of the antenna based on the zero point while displacing the one side of the antenna downward.

The stopper may be formed at the other side of the antenna and limit the rotation of the antenna.

A vertical alignment method for a vehicle radar according to another embodiment of the present invention is a vertical alignment method for a vehicle radar having an antenna that is rotatable about a shaft formed at a case in a vertical direction. The vertical alignment method includes: a step of displacing one side of the antenna upward; a step of stopping rotation of the antenna; a step of setting a point at which the rotation of the antenna is stopped as a zero point for vertical alignment; and a step of performing the vertical alignment of the antenna based on the zero point.

The one side of the antenna may be displaced upward or downward by an antenna rotary member that is in contact with a lower portion of the one side of the antenna.

The step of stopping rotation of the antenna may include stopping the rotation of the antenna by means of a stopper that is disposed away from a lower portion of the other side of the antenna and limits the rotation of the antenna.

The step of performing the vertical alignment of the antenna may include performing the vertical alignment based on power of reflected waves which the antenna receives.

The step of performing the vertical alignment of the antenna may include: a step of sequentially rotating the one side of the antenna in one direction based on the zero point in units of a preset first angle; a step of stopping the rotation of the antenna first when it is determined that an amount of rotation of the antenna exceeds an amount of rotation at which the power of the reflected waves received by the antenna reaches a maximum value; a step of sequentially rotating the one side of the antenna in another direction in units of a second angle smaller than the first angle; and a step of stopping the rotation of the antenna when a difference between a value of the power of the reflected waves received by the antenna and a maximum value measured in the step of stopping the rotation of the antenna is less than or equal to a preset value.

According to the vertical alignment apparatus for the vehicle radar according to one embodiment of the present invention and the vertical alignment method for the vehicle radar according to another embodiment of the present invention, the point at which the rotation of the antenna is stopped by the stopper formed at the case is set as the zero point, and then the vertical alignment is performed based on the zero point. Therefore, no separate horizontal sensor is required, which leads to an effect of saving a manufacturing cost and an effect of reducing manufacturing processes.

The effects of the present invention are not limited to the aforementioned effects, and other unmentioned effects can be clearly understood by those skilled in the art from the following description.

BRIEF DESCRIPTION OF THE DRAWINGS

The foregoing and other objects, features and advantages of the invention will become more apparent from the following more particular description of exemplary embodiments of the invention and the accompanying drawings. The drawing is not necessarily to scale, emphasis instead being placed upon illustrating the principles of the invention.

DETAILED DESCRIPTION OF THE INVENTION

Figure 1:
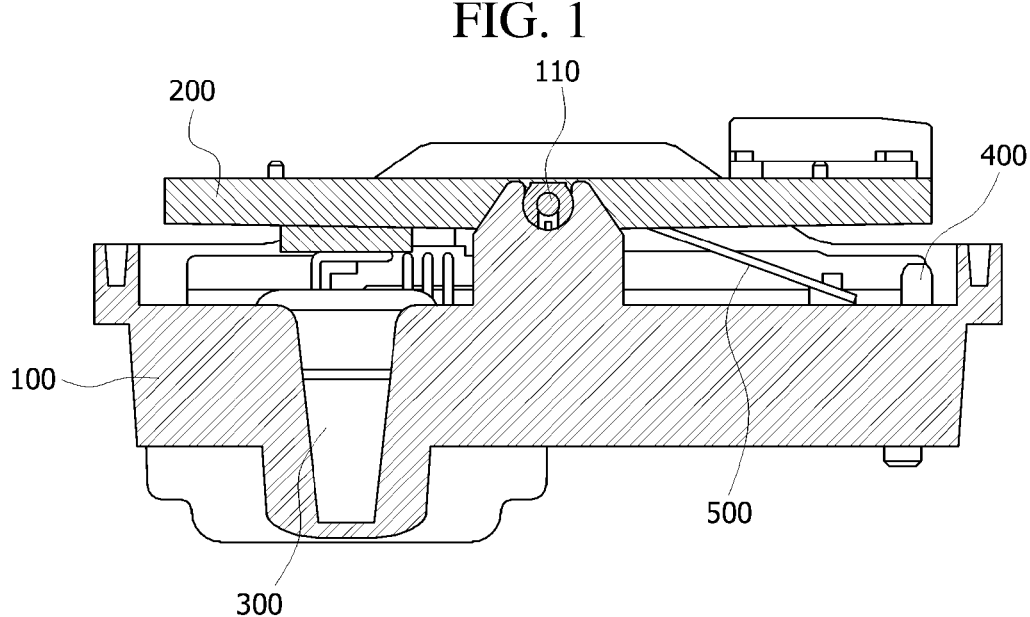
FIG. 1 is a view illustrating a configuration of a vertical alignment apparatus for a vehicle radar according to an embodiment of the present invention.

Exemplary embodiments of the present invention will be described below in detail with reference to the accompanying drawings. The same or like components are given the same reference numerals throughout the figures, and duplicate description thereof will be omitted.

Further, in the description of the present invention when it is determined that detailed description of the related art would obscure the gist of the present invention, description thereof will be omitted. It should also be noted that the accompanying drawings are merely provided to facilitate understanding of the scope of the present invention, and should not be construed as limiting to the scope of the present invention.

In order to ensure performance of radar after the radar is mounted on a vehicle, vertical alignment should be perforated such that the front of the radar s parallel to the ground. Such vertical alignment can be classified as a manual mode using a bolt or an automatic mode using a motor. In the case of the automatic mode, since the motor is used when the vertical alignment of the radar is performed, a horizontal sensor is used to check a twist angle of the motor.

In particular, a vertical alignment apparatus for a vehicle radar according to an embodiment of the present invention and a vertical alignment method for a vehicle radar according to another embodiment of the present invention are associated with the automatic mode.

Hereinafter, a vertical alignment apparatus for a vehicle radar according to an embodiment of the present invention will be described with reference to FIGS. 1 to 3.

FIG. 1 is a view illustrating a configuration of a vertical alignment apparatus for a vehicle radar according to an embodiment of the present invention. FIGS. 2 and 3 are views illustrating an operation of an antenna rotary member in the vertical alignment apparatus for the vehicle radar according to the embodiment of the present invention.

As illustrated in FIG. 1, the vertical alignment apparatus for the vehicle radar according to the embodiment of the present invention is configured to include a case 100, an antenna 200, an antenna rotary member 300, and a stopper 400.

The case 100 is configured to house the antenna 200, the antenna rotary member 300, and the stopper 400 that have been described above, and an elastic member 500 that will be described below, and is provided with a shaft 110 coupled with the antenna 200.

As illustrated in FIG. 1, the shaft 110 is preferably formed in the middle of the case 100 rather than on one end or the other end of the case 100, and thereby an antenna module itself can be reduced in thickness.

The antenna 200 is coupled with the shaft 110 formed at the case 100, and is disposed to be rotatable about the shaft 110 in a vertical direction. Vertical alignment of the vehicle radar can be performed through the vertical rotation of the antenna 200.

The antenna rotary member 300 is configured to rotate the antenna 200, and the stopper 400 is configured to limit an angle of rotation of the antenna 200.

To be specific, the antenna rotary member 300 displaces one side of the antenna 200 upward or downward, thereby rotating the antenna 200. The stopper 400 is disposed away from a lower portion of the other side of the antenna 200. Alternatively, the stopper 400 may be directly formed at the other side of the antenna 200, and particularly the lower portion of the other side of the antenna 200.

Figure 2:
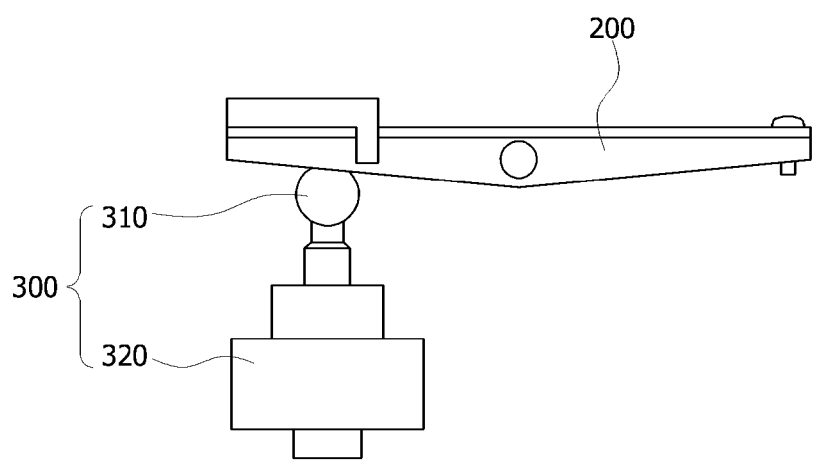
FIGS. 2 and 3 are views illustrating an operation of an antenna rotary member in the vertical alignment apparatus for the vehicle radar according to the embodiment of the present invention.
Figure 3:
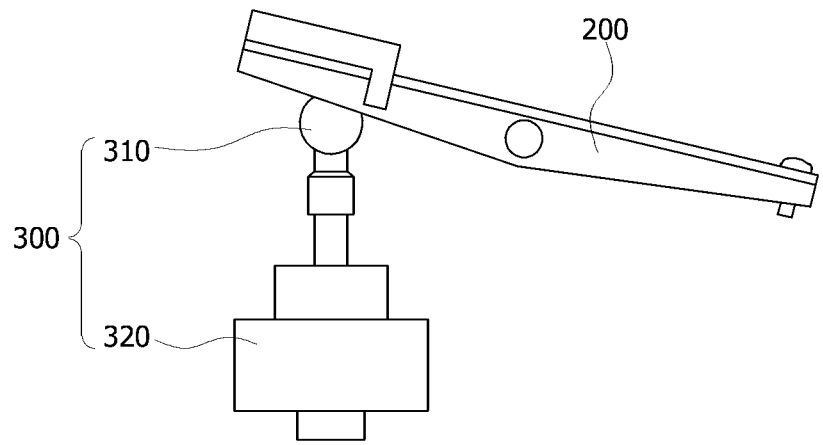

As illustrated in FIGS. 2 and 3, the antenna rotary member 300 is made up of a vertical motion part 310 and a motor 320.

The vertical motion part 310 is in contact with a lower portion of one side of the antenna 200, and is configured to displace the one side of the antenna 200 in a vertical direction. The motor 320 serves to drive the vertical motion part 310 so as to be able to move the vertical motion part 310 up and down.

Thus, when the vertical motion part 310 is displaced upward or downward by the motor 320, the one side of the antenna 200 is also displaced upward or downward by the operation of the vertical motion part 310.

As described above, the antenna 200 is rotated about the shaft 110 formed at the case 100 in the vertical direction. For this reason, when the one side of the antenna 200 is displaced upward or downward, the other side of the antenna 200 is displaced downward or upward in inverse relation to the one side of the antenna 200.

Preferably, the vertical alignment apparatus for the vehicle radar according to the embodiment of the present invention further includes the elastic member 500 that is disposed at the other side of the antenna 200 and supports the antenna 200.

As described above, since the antenna rotary member 300 is disposed at the one side of the antenna 200, when the one side of the antenna 200 is displaced upward by the antenna rotary member 300, the other side of the antenna 200 is displaced downward, passes a line on which the antenna 200 is parallel to the ground, and then is displaced below the one side of the antenna 200.

In this case, without the elastic member 500 disposed at the other side of the antenna 200, the other side of the antenna 200 will be continuously displaced downward due to gravity, and the one side of the antenna 200 will be continuously displaced upward. As a result, the rotation of the antenna 200 is not controlled by the antenna rotary member 300.

Therefore, to prevent this problem, the elastic member 500 is provided at the other side of the antenna 200. A spring is preferably employed as the elastic member 500.

To be specific, as illustrated in FIG. 1, the elastic member 500 is coupled with the antenna 200 and the case 100, thereby supporting the antenna 200. The elastic member 500 is preferably coupled to the antenna 200 in the vicinity of the shaft 110.

In this case, a displacement value of the elastic member 500 caused by the rotation of the antenna 200 can be reduced. Thereby, an elastic force of the elastic member 500 can be uniformly distributed to the entire antenna 200, and the elastic force of the elastic member 500 can be prevented from being reduced.

The vertical alignment of the vehicle radar is performed as follows by each component of the aforementioned vertical alignment apparatus for the vehicle radar according to the embodiment of the present invention.

First, the antenna rotary member 300 displaces one side of the antenna 200 upward, and the antenna 200 is rotated about the shaft 110 formed at the case 100 in a vertical direction. Thereby, the other side of the antenna 200 is displaced downward.

The antenna 200 is rotated in a vertical direction until the other end of the antenna 200 comes into contact with the stopper 400 disposed away from the other side of the antenna 200, so that the other end of the antenna 200 stops rotating when it comes into contact with the stopper 400.

Here, a point at which the other side of the antenna 200 comes into contact with the stopper 400 is set as a zero point for the vertical alignment of the antenna 200.

After the zero point for the vertical alignment of the antenna 200 is set, the antenna rotary member 300 performs the vertical alignment based on the set zero point while displacing the one side of the antenna 200 downward.

Meanwhile, if the stopper 400 is directly formed at the other side of the antenna 200, the stopper 400 is also displaced together with the antenna 200 when the antenna 200 is displaced. The rotation of the antenna 200 stops when the stopper 400 comes into contact with a region of the case which corresponds to the stopper 400. This region is set as the zero point for the vertical alignment of the antenna 200.

In order to realize the vertical alignment of the vehicle radar in this way, when the other side of the antenna 200 comes into contact with the stopper 400 or when the stopper 400 directly formed at the antenna 200 comes into contact with the bottom of the case, an angle between the antenna 200 and the ground should be checked in advance to calculate an amount of alignment, and the motor 320 of the antenna rotary member 300 should be controlled based on the amount of alignment.

The amount of alignment should preferably be calculated in an initial design step, and finally set after several tests in a step of manufacturing a working sample. Further, when the vertical alignment of the vehicle radar is requested after the amount of alignment is stored in an electric control unit (ECU), the antenna 200 may be controlled based on the amount of alignment by the ECU.

Meanwhile, the vertical alignment may be performed based on power of reflected waves which the antenna 200 receives when the antenna 200 is rotated in order to realize the vertical alignment of the vehicle radar. This will be described in detail when a vertical alignment method for a vehicle radar according to another embodiment of the present invention is described.

As a result, the vertical alignment apparatus for the vehicle radar according to the embodiment of the present invention can easily perform the vertical alignment without a separate horizontal sensor.

Hereinafter, a vertical alignment method for a vehicle radar according to another embodiment of the present invention will be described with reference to FIG. 4.

Figure 4:
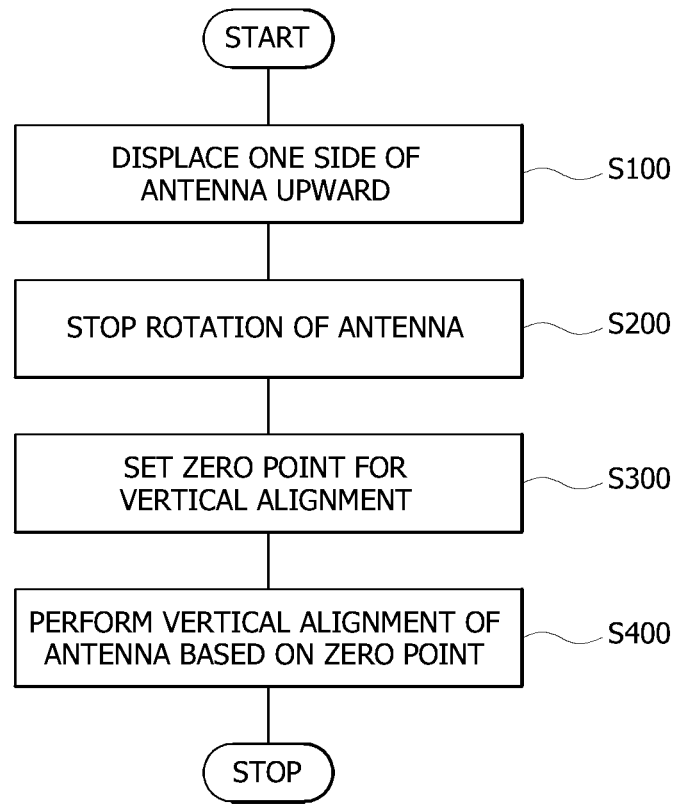
FIG. 4 is a flow chart showing a vertical alignment method for a vehicle radar according to another embodiment of the present invention in time series.
Figure 5:
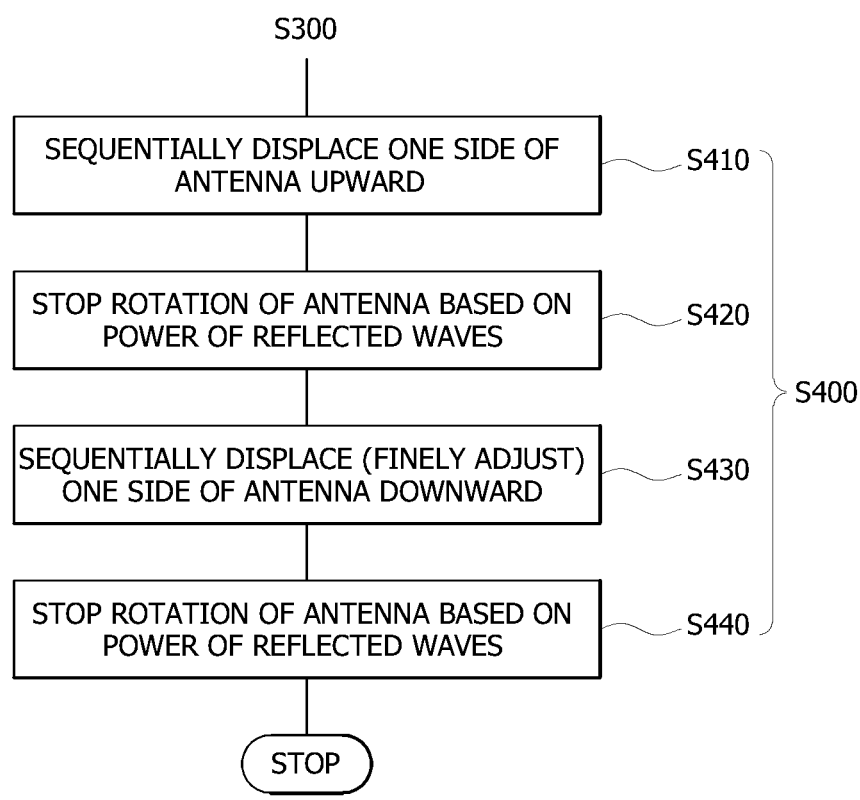
FIG. 5 is a flow chart showing the step of performing the vertical alignment of the antenna (200) based on the zero point of FIG. 4 which is specified in time series.

FIG. 4 is a flow chart showing a vertical alignment method for a vehicle radar according to another embodiment of the present invention in time series. FIG. 5 is a flow chart showing the step of performing the vertical alignment of the antenna (200) based on the zero point S400 of FIG. 4 subdivided in greater detail.

The vertical alignment method for the vehicle radar according to the other embodiment of the present invention is a method for performing vertical alignment of the vehicle radar having an antenna 200 that is rotatable about a shaft 110 formed at a case 100 in a vertical direction, and includes, as shown in FIG. 4, a step S100 of displacing one side of the antenna 200 upward, a step S200 of stopping rotation of the antenna 200, a step S300 of setting a point at which the rotation of the antenna 200 stops as a zero point for vertical alignment, and a step of performing the vertical alignment of the antenna 200 based on the set zero point.

Further, the one side of the antenna 200 is preferably displaced upward or downward by an antenna rotary member 300 that is in contact with a lower portion of one side of the antenna 200. In this case, the antenna rotary member 300 includes a vertical motion part 310 that is in contact with a lower portion of the one side of the antenna 200 and is movable in a vertical direction, and a motor 320 that drives the vertical motion part 310.

Meanwhile, in the step of stopping the rotation of the antenna 200, the rotation of the antenna 200 is preferably stopped by a stopper 400 that is disposed away from a lower portion of the other side of the antenna 200 and limits the rotation of the antenna 200.

Furthermore, the antenna 200 is preferably supported by an elastic member 500 disposed at the other side of the antenna 200. The reason for this was described above in reference to the vertical alignment apparatus for the vehicle radar according to the embodiment of the present invention, and detailed description thereof will be omitted here.

Particularly, in order to perform correct vertical alignment in the step S400 of performing the vertical alignment of the antenna 200, as described above, when the other side of the antenna 200 comes into contact with the stopper 400, the angle between the antenna 200 and the ground should be checked in advance to calculate the amount of alignment, and the motor 320 of the antenna rotary member 300 should be controlled based on the amount of alignment.

Meanwhile, in the step S400 of performing the vertical alignment of the antenna 200, the vertical alignment of the antenna 200 can be performed based on power of reflected waves which the antenna 200 receives. Hereinafter, the step S400 of performing the vertical alignment of the antenna 200 will be described in detail with reference to FIG. 5.

As shown in FIG. 5, the step S400 of performing the vertical alignment of the antenna 200 includes a step S410 of sequentially rotating the one side of the antenna 200 in one direction based on a zero point in units of a preset first angle.

For example, when the first angle is 0.3 degrees, the antenna 200 is sequentially rotated based on the zero point set in the third step S300 to 0.3°, 0.6°, 0.9° . . . , and the power of the reflected waves received by the antenna 200 is measured.

Afterwards, when it is determined that an amount of rotation of the antenna 200 exceeds an amount of rotation when the power of the reflected waves received by the antenna 200 reaches a maximum value, a step S420 of stopping the rotation of the antenna 200 is performed.

To be specific, when the antenna 200 is rotated from the zero point, the power of the reflected waves changes in a gradually increasing direction. The power of the reflected waves reaches the maximum value at a position at which the antenna 200 is perpendicular to the ground. When the antenna 200 is further rotated past the point in time at which the power of the reflected waves reaches the maximum value, the power of the reflected waves is reduced.

As described above, since the power of the reflected waves is measured while the antenna 200 is rotated in units of the preset first angle, it is difficult to calculate an accurate amount of rotation of the antenna at which the power of the reflected waves reaches the maximum value. For this reason, a pattern in which the power of the reflected waves changes is analyzed, and the rotation of the antenna 200 is stopped when the power of the reflected waves changes from an increase to a decrease.

Afterwards, for the purpose of precise vertical alignment of the antenna 200, the antenna 200 is rotated in a direction opposite to the rotation direction thereof at the step S410 of rotating the one side of the antenna 200 in units of the preset first angle. In this case, a step S430 of sequentially rotating the antenna 200 in units of a second angle smaller than the first angle is performed. Thereby, the vertical alignment of the antenna 200 can be performed more precisely.

Then, when the power of the reflected waves received by the antenna 200 reaches the maximum value, a step S440 of stopping the rotation of the antenna 200 is performed. As described above, in the step S430 of sequentially rotating the one side of the antenna 200 in another direction, the power of the reflected waves is measured while the antenna 200 is rotated in units of the predetermined angle. Thus, when a difference between a value of the power of the reflected waves received in the present step and a measured maximum value is less than or equal to a preset value, the rotation of the antenna 200 is preferably stopped.

The embodiments described in the present specification and the attached drawings are merely illustrative to describe a part of the technical spirit included in the present invention. Accordingly, the embodiments disclosed in the present specification are intended not to limit but to describe the technical spirit of the present invention. Thus, it is apparent that the scope of the technical spirit of the present invention is not limited by this embodiment. It should be interpreted that other modifications and specific embodiments which those with ordinary knowledge in the art can easily infer within the scope of the technical spirit included in the specification and drawings of the present invention also fall within the technical scope of the present invention.

What is claimed is:

1. A vertical alignment apparatus for a vehicle radar comprising:
    a case at which a shaft is formed;
    an antenna coupled with the shaft and disposed to be rotatable about the shaft in a vertical direction;
    an antenna rotary member rotating the antenna; and
    a stopper limiting an angle of rotation of the antenna,
    wherein:
        the antenna rotary member displaces one side of the antenna upward or downward so as to rotate the antenna; and
        the stopper is disposed away from a lower portion of the other side of the antenna and limits the rotation of the antenna.

2. The vertical alignment apparatus according to claim 1, wherein the antenna rotary member includes:
    a vertical motion part that is in contact with a lower portion of the one side of the antenna and is movable in a vertical direction; and
    a motor that drives the vertical motion part.

3. The vertical alignment apparatus according to claim 1, further comprising an elastic member, one side and the other side of which are respectively coupled with the antenna and the case and which supports the antenna.

4. The vertical alignment apparatus according to claim 3, wherein the one side of the elastic member is coupled with the antenna in the vicinity of the shaft.

5. The vertical alignment apparatus according to claim 1, wherein a point at which the other side of the antenna comes into contact with the stopper when the antenna rotary member displaces the one side of the antenna upward is set as a zero point for vertical alignment of the antenna.

6. The vertical alignment apparatus according to claim 5, wherein, after the zero point for the vertical alignment of the antenna is set, the antenna rotary member performs the vertical alignment of the antenna based on the zero point.

7. A vertical alignment method for a vehicle radar having an antenna that is rotatable about a shaft formed at a case in a vertical direction, the vertical alignment method comprising:
    a step of displacing one side of the antenna upward;
    a step of stopping rotation of the antenna;
    a step of setting a point at which the rotation of the antenna is stopped as a zero point for vertical alignment; and
    a step of performing the vertical alignment of the antenna based on the zero point,
    wherein the step of stopping rotation of the antenna includes stopping the rotation of the antenna by means of a stopper that is disposed away from a lower portion of the other side of the antenna and limits the rotation of the antenna.

8. The vertical alignment method according to claim 7, wherein the one side of the antenna is displaced upward or downward by an antenna rotary member that is in contact with a lower portion of the one side of the antenna.

9. The vertical alignment method according to claim 7, wherein the step of performing the vertical alignment of the antenna includes performing the vertical alignment based on power of reflected waves which the antenna receives.

10. A vertical alignment method for a vehicle radar having an antenna that is rotatable about a shaft formed at a case in a vertical direction, the vertical alignment method comprising:

a step of displacing one side of the antenna upward;

a step of stopping rotation of the antenna;

a step of setting a point at which the rotation of the antenna is stopped as a zero point for vertical alignment; and a step of performing the vertical alignment of the antenna based on the zero point, wherein the step of performing the vertical alignment of the antenna includes performing the vertical alignment based on power of reflected waves which the antenna receives, and wherein the step of performing the vertical alignment of the antenna includes:

a step of sequentially rotating the one side of the antenna in one direction based on the zero point in units of a preset first angle;

a step of stopping the rotation of the antenna first when it is determined that an amount of rotation of the antenna exceeds an amount of rotation at which the power of the reflected waves received by the antenna reaches a maximum value;

a step of sequentially rotating the one side of the antenna in another direction in units of a second angle smaller than the first angle; and a step of stopping the rotation of the antenna when a difference between a value of the power of the reflected waves received by the antenna and a maximum value measured in the step of stopping the rotation of the antenna first is less than or equal to a preset value.

\* \* \* \* \*